March 31, 1942.　　R. L. CHAPMAN　　2,278,242
EVAPORATIVE COOLER
Filed Dec. 28, 1940

Inventor:
Robert L. Chapman.
by Harry E. Dunham
His Attorney.

Patented Mar. 31, 1942

2,278,242

UNITED STATES PATENT OFFICE 2,278,242

EVAPORATIVE COOLER

Robert L. Chapman, Erie, Pa., assignor to General Electric Company, a corporation of New York Application December 28, 1940, Serial No. 372,101

3 Claims. (Cl. 257—2)

My invention relates to coolers of the evaporative type and particularly to evaporative condensers for refrigerating machines and the like.

Evaporative coolers and condensers are frequently employed in localities where a sufficient supply of water is not available for cooling purposes. In the evaporative type of cooler, water is sprayed over the surface of the cooler in a stream of air so that the evaporation of the water increases the cooling effect. The water not evaporated on the cooler passes to a sump from which it is recirculated, thereby making possible a more economical use of the water. In coolers of this type it is often desirable to vary the amount of water flowing over the surface of the cooler in order to change the effective cooling capacity, and this may be done by changing the amount of water supplied to the sprayers. However, it has been found that upon decreasing the amount of water supplied, some areas of the surface of the cooler are supplied with such a small amount of water that it evaporates so rapidly that none of it flows from the surface and any impurities are, therefore, deposited on the cooler. The result is an increased accumulation of lime and other deposits on the surface of the cooler.

It is an object of my invention to provide an evaporative cooler having an improved arrangement for controlling the effective capacity thereof and for minimizing the accumulation of deposits caused by the complete evaporation of water on portions of the surface of the cooler.

Further objects and advantages of my invention will become apparent as the following description proceeds, and the features of novelty which characterize my invention will be pointed out with particularity in the claims annexed to and forming a part of this specification.

Figure 1:
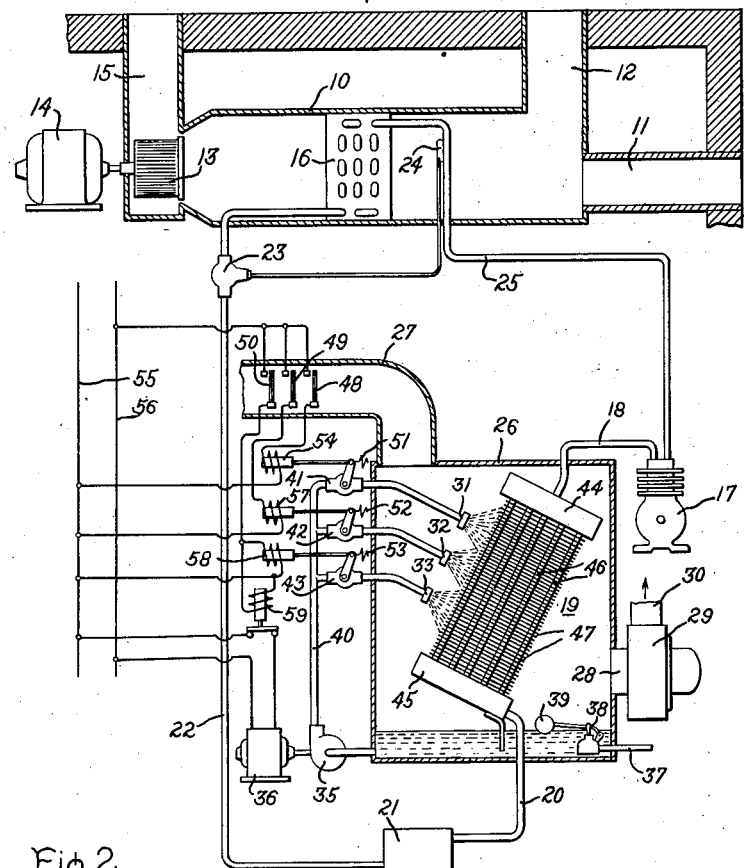
Figure 2:
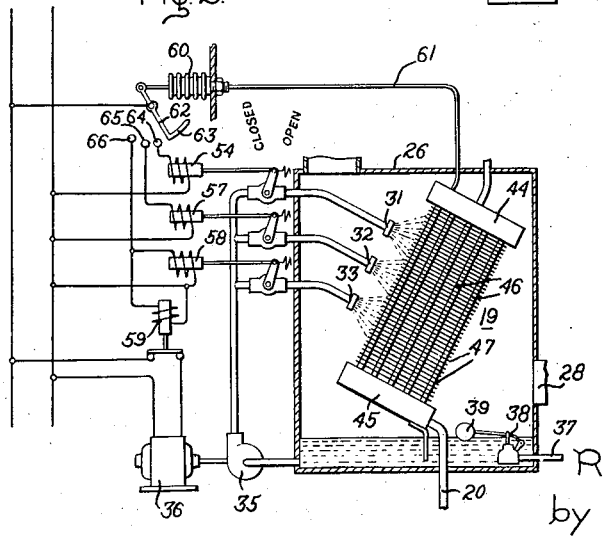

For a better understanding of my invention reference may be had to the accompanying drawing in which Fig. 1 illustrates diagrammatically an air conditioning system provided with an evaporative condenser embodying my invention, and Fig. 2 is a view of an evaporative condenser similar to that shown in Fig. 1 embodying a modification of my invention.

The air conditioning system illustrated in the drawing is provided with an evaporative condenser having an arrangement for controlling the amount of water sprayed over the surface thereof. A plurality of sprays are provided and each spray is operated either fully on or fully off and is so arranged that it serves a separate and limited area of the surface of the condenser. When a spray is shut off, the area served thereby becomes dry and is not wet with water from the other sprays. The evaporative condenser preferably comprises a vertical coil bank so that the sprays can be located at different levels and so that the control can shut off the sprays successively from the top to the bottom. This minimizes any tendency of water to flow by gravity over the areas served by the sprays which have been cut out of operation.

Referring now to the drawing in Fig. 1, I have shown an air conditioning system including a duct 10 having an inlet 11 for fresh air and an inlet 12 for room air. A mixture of fresh air and room air is circulated through the duct by the operation of a fan 13 driven by a motor 14 and is discharged through a duct 15 into the room to be conditioned. In order to cool the air passing through the duct, I provide a cooling coil 16 arranged across the duct in the path of the air and connected in the refrigerant circuit of a refrigerating machine. The refrigerating machine comprises a compressor 17 arranged to discharge compressed refrigerant through a conduit 18 to a condenser 19. The compressed refrigerant is cooled and liquefied in the condenser and flows through a connection 20 to a liquid receiver 21. Liquid from the receiver 21 flows through a liquid line 22 and is supplied to the evaporator 16 by operation of a thermostatic expansion valve 23 having a thermal bulb or element 24 responsive to the temperature of vaporized refrigerant drawn from the evaporator 16 through a suction line 25. The condenser 19 is of the evaporative type and is surrounded by a housing 26, having an air inlet duct 27 and an air outlet 28. Air is circulated through the housing 26 and over the surface of the condenser 19 by operation of a fan 29 arranged to withdraw air from the outlet 28 and discharge it through a connection 30. In order to wet the surface of the condenser 19 and to utilize the evaporation of the water to cool the condenser, I provide a plurality of rows of nozzles 31, 32 and 33 arranged to spray water over the surface of the condenser. A body of water is maintained in the bottom of the casing 26 and is circulated by operation of a pump 35, driven by a motor 36. Make-up water is supplied to the housing 26 through a pipe 37 by a valve 38 operated by a float 39. The pump 35 is provided with a discharge pipe 40 and water is supplied to the nozzles 31, 32 and 33 under control of suitable valves 41, 42 and 43.

The condenser is preferably constructed as a substantially upright bank of tubes or coils. The condenser 19 as illustrated comprises a top-header 44 and a bottom-header 45 connected by a plurality of tubes 46, the tubes being provided with transverse heat radiating fins 47. The rows of nozzles 31, 32 and 33 are arranged at different levels to direct sprays of water against separate horizontal portions of the extended surface area of the condenser and the velocity of the air circulated through the housing 26 by operation of the fan 29 is preferably made sufficiently high so that the air flowing parallel to the fins 47 over the tubes 46 tends to make the water from the sprays flow directly through the condenser and to minimize the flowing of water from any one spray onto the area served by the other sprays.

The effective capacity of an evaporative condenser may be changed by changing the rate of flow of water over its surface. However, when the rate of flow is small, there may be areas of the surface in which the evaporation is at a sufficiently high rate that no water flows away from the surface and impurities in the water are therefore left as a deposit on these areas. I have found that by operating the sprays so that any one spray is either fully on or fully off the effective total capacity of the evaporator may be varied by changing the number of sprays and that this minimizes the formation of deposits on the surface of the condenser. When any one spray is shut off, the area served by that spray remains dry. I also prefer to shut off the sprays 31, 32 and 33 in sequence from the top to the bottom of the evaporator so that there is no tendency of water to flow by gravity over a surface not served by an active spray. In the arrangement shown in Fig. 1, the sprays 31, 32 and 33 are cut in and out depending upon the temperature of the air admitted to the housing 26 through the inlet duct 27. In order to control the sprays in this manner, I provide thermostats 48, 49 and 50 in the duct 27 arranged to actuate valves 41, 42 and 43, respectively. The valves 41, 42, and 43 are biased to their open positions by springs 51, 52, and 53. When the temperature of the air passing through the duct 27 falls below a predetermined value, the thermostat 48 closes a circuit of a solenoid 54 connecting a solenoid across power supply lines 55 and 56. When the solenoid is energized, the valve 41 is closed and the spray 31 shut off. The top portion of the surface area of the condenser 19 is then operated dry and the effective capacity of the condenser is reduced. Upon a still further reduction of the temperature in duct 27, the thermostat 49 closes the circuit of a solenoid 57 and shuts off the supply of water to the nozzle 32; and if the temperature of the air in the duct 27 becomes still lower, the thermostat 50 closes to shut off the valve 33 by operation of a solenoid 58, thereby stopping the supply of water to the condenser. Simultaneously with the energization of the solenoid 58, a relay 59 is operated to open the circuit of the motor 36 and stop the operation of the pump 35. The condenser 19 operates as an air-cooled condenser at all temperatures at which the thermostat 50 closes the circuit of the solenoid 58.

During the operation of the air conditioning system as shown in Fig. 1, air is circulated through the duct 10 by the fan 13 and is cooled by the evaporator 16 through which liquid refrigerant is circulated under control of the valve 23. Liquid refrigerant in the evaporator is vaporized by the absorption of heat from the air passing over the surface of the evaporator and the vaporized refrigerant is withdrawn through the suction line 25 by operation of the condenser 19. The compressor 17 compresses refrigerant and discharges it through the connection 18 to the condenser 19. If the temperature of the air admitted to the connection 26 is above a predetermined value, all the nozzles 31, 32 and 33 are supplied with water which is sprayed over the surface of the condenser to increase its effective cooling capacity. The compressed refrigerant is cooled in the condenser and liquefies and flows through the connection 20 into the liquid receiver 21 from which it is again supplied to the evaporator under control of the valve 23. If the temperature of the air passing through the duct 27 decreases from a predetermined value, the sprays 31, 32 and 33 are shut off successively from the top to the bottom of the unit dependent upon the temperature of the air, and when the temperature of the air is below a lower predetermined value, all the sprays are shut off and the operation of the pump 35 is stopped. On raising the temperature of the air in the duct 27, the sprays are started successively from the bottom of the condenser to the top. Since each of the sprays is either fully on or fully off, the area served thereby is either wet or dry because each portion of the surface area of the condenser is served by only one spray and the other sprays do not wet that portion. The accumulation of the deposits of lime and other foreign matter on the surface of the condenser due to complete evaporation of water is therefore minimized.

In Fig. 2 I have shown an evaporative condenser embodying a modified form of my invention. This condenser is similar to that shown in Fig. 1 and corresponding parts have been designated by the same numerals. The successive operations of the sprays in Fig. 2 is dependent upon the changes of the pressure of refrigerant within the condenser instead of upon the temperature of the air passing through the housing 26, and in order to effect this control, I provide a pressure responsive bellows 60 connected in communication with the header 44 by a suitable tube or duct 61. The bellows 60 is connected to rotate an arm 62 having a shoe 63 arranged to engage successively contacts 64, 65 and 66, and thereby energize solenoids 54, 57, and 58, respectively. When the shoe 63 engages the contact 66, it energizes the coil of relay 59 in the same manner as the operation of the thermostat 50 of Fig. 1 to stop the motor 36 of the pump 35. The operation of the evaporative condenser shown in Fig. 2 is similar to that shown in Fig. 1, nozzles 31, 32 and 33 being supplied with water depending upon the pressure in the condenser 19, the sprays being cut out successively from the top to the bottom of the condenser as the pressure in the condenser is reduced below a predetermined value.

From the foregoing it is apparent that I have provided a simple and effective arrangement for changing the capacity of an evaporative condenser in accordance with the load requirements thereof while minimizing the deposit of foreign matter on the surface of the condenser due to the evaporation of water and also making possible a more economical use of the water.

While I have shown my invention in connection with an air conditioning system, other applications will readily be apparent to those skilled in the art. I do not therefore desire my invention to be limited to the particular construction shown and described, and I intend in the appended claims to cover all modifications within the true spirit and scope of my invention.

What I claim as new and desire to secure by Letters Patent of the United States, is:

1. An evaporative cooler comprising a substantially upright bank of tubes for containing a fluid to be cooled, means including a duct for directing a stream of air over said bank of tubes, means including a plurality of nozzles for spraying water onto the surface of said bank of tubes at a plurality of different levels, each of said nozzles being arranged to direct its spray onto a separate portion of the surface of said bank of tubes, and means dependent upon changes in the cooling demand of said cooler for selectively determining the number of said nozzles to be supplied with water and for cutting said nozzles out of operation successively from the top to the bottom level of said bank of tubes whereby each separate portion of said surface will be dry when its corresponding nozzle is not in operation.

2. An evaporative cooler comprising a substantially upright bank of tubes for containing a fluid to be cooled, means including a duct for directing a stream of air over said bank of tubes, means including a pump and a plurality of nozzles for spraying water onto the surface of said bank of tubes at a plurality of different levels, each of said nozzles being arranged to direct its spray onto a separate portion of the surface of said bank of tubes, means dependent upon changes in the cooling demand of said cooler for selectively determining the number of said nozzles to be supplied with water and for cutting said nozzles out of operation successively from the top to the bottom level of said bank of tubes whereby each separate portion of said surface will be dry when its corresponding nozzle is not in operation, and means for stopping the operation of said pump concurrently with the cutting off of the supply of water to the lowermost one of said nozzles.

3. An evaporative cooler comprising a bank of tubes for containing a fluid to be cooled, a plurality of parallel heat radiating fins arranged on said tubes transversely thereof, means including a plurality of sprays for spraying water onto the surface of said bank of tubes along said fins transversely of said tubes, each of said sprays being arranged to direct its spray onto a separate portion of the surface of said bank of tubes, means including a duct for directing a stream of air over said bank of tubes, said bank of tubes being so arranged that the stream of air passes simultaneously over said separate portions in parallel flow, and means dependent upon changes in the cooling demand of said cooler for selectively determining the number of said sprays to be supplied with water and for cutting the remaining sprays out of operation whereby each separate portion of said surface will be dry when its corresponding spray is not in operation.

ROBERT L. CHAPMAN.